July 21, 1970 W. C. CONKLING 3,521,486
DIFFERENTIAL PRESSURE-RESPONSIVE DEVICE FOR MEASURING
FLUID FLOW RATE INCLUDING A SHAPED
SPRING FOR SQUARE ROOT EXTRACTION
Filed July 5, 1968 2 Sheets-Sheet 1
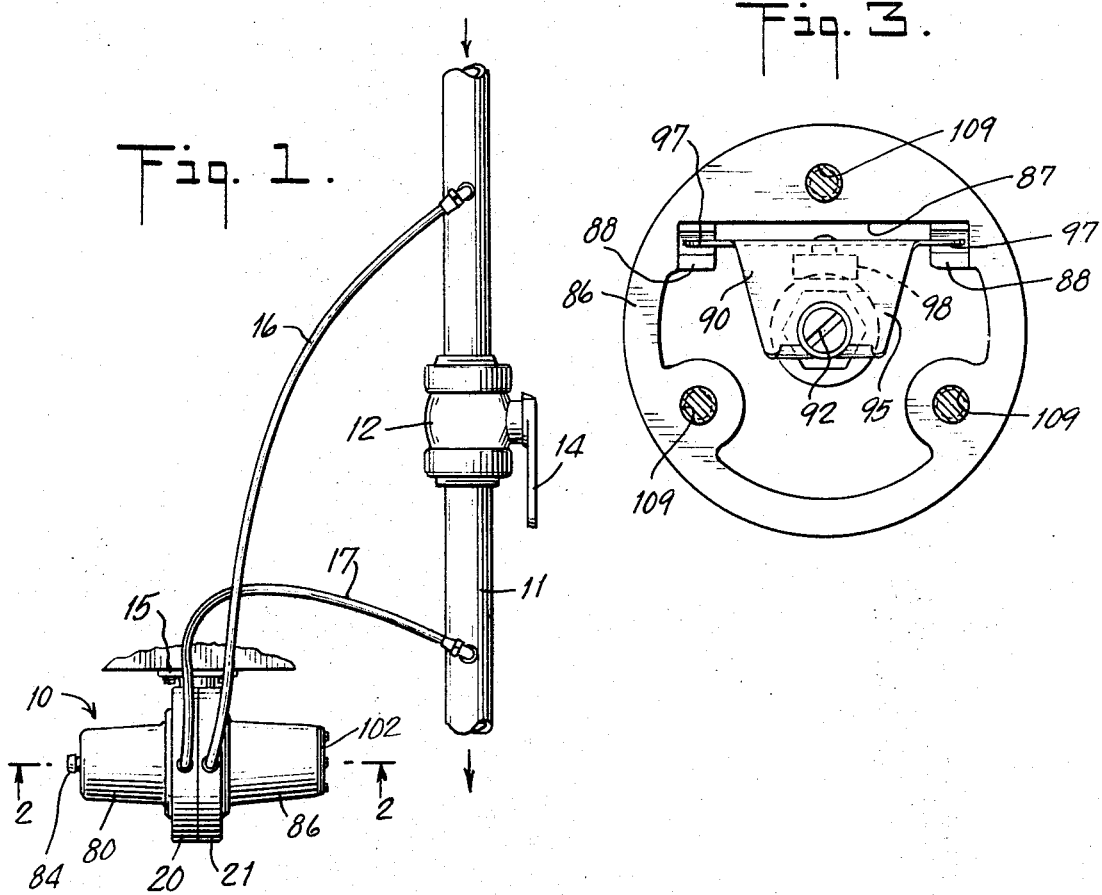
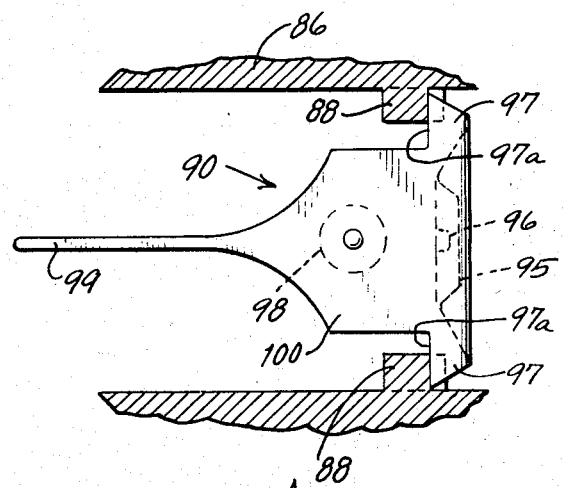
INVENTOR.
WILLIAM C. CONKLING
BY Christopher C. Dunbar
ATTORNEY United States Patent Office 3,521,486
Patented July 21, 1970

3,521,486
DIFFERENTIAL PRESSURE-RESPONSIVE DEVICE FOR MEASURING FLUID FLOW RATE INCLUDING A SHAPED SPRING FOR SQUARE ROOT EXTRACTION
William C. Conkling, Essex Fells, N.J., assignor to Pennwalt Corporation, a corporation of Pennsylvania
Filed July 5, 1968, Ser. No. 742,838
Int. Cl. G01f 1/08; F16f 1/22
U.S. Cl. 73—205                                6 Claims

ABSTRACT OF THE DISCLOSURE

A device for producing an output signal representative of fluid flow rate in response to the sensed magnitude of differential pressure across a restriction established in the path of fluid flow, including, within a housing, a peripherally supported slack diaphragm having opposite sides acted on by pressures respectively upstream and downstream of the restriction, and a leaf spring connected to one side of the diaphragm and supported by the housing for pivotal movement in correspondence with movement of the diaphragm effected by change in differential pressure. The leaf spring has a free end so positioned that as the diaphragm moves from zero position in response to progressively increasing pressure differential, the resulting pivotal motion of the spring causes this free end to be progressively deformed against a flat surface of the housing structure, and thereby to exert an exponentially increasing biasing force on the diaphragm tending to oppose the diaphragm displacement. The mounting of the spring, and the configuration of the spring free end, are adapted to produce a biasing force which varies with extent of diaphragm displacement from zero position in such manner that the diaphragm displacement is linearly proportional to the square root of the differential pressure, and hence linearly proportional to the flow rate. Means are provided for producing an electrical output signal proportional to diaphragm displacement; this signal may be applied to actuate apparatus such as a flow rate indicator or recorder, or control instrumentalities, e.g., for adjusting the flow rate.

BACKGROUND OF THE INVENTION

This invention relates to devices for producing, in response to a displacing force, an output motion or indication representative of a value which is exponentially related to the displacing force, such devices having utility in meters and like measuring instrumentalities. In a specific sense, the invention is directed to fluid flow meters of the differential pressure type and, more particularly, to devices for converting sensed magnitude of differential pressure into a reading representative of flow rate.

The differential pressure, or pressure drop, created in a path of fluid flow across a restriction (such as a venturi, orifice or the like) established in the flow path is proportional to the square of the flow rate. Various forms of flow meters are known which measure rate of fluid flow by sensing the pressure drop across a restriction in the flow path and converting the sensed magnitude of the pressure drop into a flow rate reading. Typically, these known meters include a movable pressure-responsive element or liquid column which undergoes displacement in linear proportion to changes in the magnitude of the pressure drop and which either constitutes or actuates an indicator moving across a scale calibrated in units of flow rate so as to provide a flow rate reading. Owing to the aforementioned relationship between pressure drop and flow rate, the indicator motion in such meters is proportional to the square of the flow rate and hence the graduations at the lower end of the indicator scale are necessarily much closer together than those at the upper end of the scale, detracting from readability of the scale especially for low flow rates. Moreover, again owing to the relationship between pressure drop and flow rate, the magnitudes of differential pressures corresponding to low rates of flow are so small in relation to the total operating ranges of practical differential pressure measuring devices as to greatly restrict the ability of such devices to accurately detect low flows. For example, a flow of one tenth of nominal maximum will generate only one one-hundredth of nominal differential pressure. A still further disadvantage of the nonlinear relationship between indicator or output displacement and flow rate is that a nonlinear output signal is relatively difficult to manipulate mathematically, limiting the utility of differential pressure type flowmeters in systems wherein the meter output signal (as a measure of flow rate) is employed in performance of mathematical operations.

Devices heretofore proposed for converting sensed magnitude of differential pressure to an output motion or indication that is linearly proportional to flow rate have included manometers having specially shaped walls, and mechanical linkages such as cam systems connecting a movable pressure-responsive element displaced by differential pressure to a movable indicator element. These devices, however, have been more or less complex in construction and limited in application.

SUMMARY OF THE INVENTION

An object of the present invention is to provide a new and improved device for producing, in response to a displacing force, an output motion or indication representative of a value exponentially related to the displacing force, wherein the output motion is substantially linearly proportional to such value. Another object is to provide a device for converting sensed differential pressure in a fluid flow path to an output indication of flow rate, having an element which moves, in response to change in differential pressure, in substantially linear proportion to the change in flow rate corresponding to such differential pressure change. A further object is to provide a device of this type which is simple and economical in construction, versatile in application, and accurately responsive to low as well as higher flow rates. Still another object is to provide such a device wherein disassembly (as for servicing and cleaning), reassembly and calibration may be performed in a facile and convenient manner.

To these and other ends, the present invention broadly contemplates the combination, in a device for responding to a displacing force by producing an output motion representative of a value exponentially related to the displacing force, of a movable element disposed and arranged to be acted on by the displacing force and to undergo bidirectional displacement along a limited path in response to variations in magnitude of the force; a leaf spring having a first, free end and a second end connected to the movable element; and means fixed in relation to the path for pivotally supporting the spring intermediate the ends thereof so that displacement of the element effects pivotal movement of the spring relative to the supporting means. The supporting means has a surface positioned to be progressively engaged by the spring free end in correspondence with progressive displacement of the element in a given direction in the path, for deforming the spring free end in such manner as to exert on the element a biasing force opposing movement of the element in the given direction. The spring free end is so shaped that the biasing force thereby exerted is exponentially related to the displacing force in such manner that movement of the element in response to change in the displacing force is substantially linearly proportional to the aforementioned value.

The invention further and particularly contemplates the provision of a device for producing an output signal representative of flow rate of a fluid in response to sensed magnitude of pressure differential across a restriction established in the path of fluid flow. In accordance with the invention, in this specific aspect thereof, the pressure responsive device includes structure defining first and second fluid-receiving chambers respectively adapted to communicate with localities in the path of fluid flow upstream and downstream of the restriction, and a slack diaphragm peripherally supported by the chamber-defining structure between the chambers with its major surfaces respectively exposed to the two chambers, a central portion of the diaphragm being displaceable in response to variations in the pressure differential between the chambers. The diaphragm central portion constitutes the movable element of the invention as embodied in the pressure-responsive device. In this embodiment, the aforementioned leaf spring is connected to the diaphragm central portion and undergoes pivotal motion as the diaphragm is displaced by change in differential pressure between the two chambers, and the spring-supporting means (which is fixed in relation to the chamber-defining structure) has a surface positioned to be progressively engaged by the free end of the spring upon pivotal motion of the spring in correspondence with progressive displacement of the diaphragm resulting from increasing pressure differential. The spring free end is so shaped that its progressive deformation against the latter surface produces an exponentially varying biasing force which opposes diaphragm motion in such manner that the displacement of the diaphragm from zero position (i.e., the position corresponding to zero pressure differential) is linearly proportional to the square root of the differential pressure, and thus linearly proportional to the flow rate.

The displacement of the diaphragm is converted to an electrical output signal as by means of a differential transformer which has an armature that moves with the diaphragm, and which produces an output voltage proportional to diaphragm displacement. The output signal may be used to actuate indicating, recording or control instrumentalities. As will be appreciated, the magnitude of this signal is linearly proportional to the rate of fluid flow being measured.

In preferred embodiments, the leaf spring is connected to the diaphragm by means of a rod which is carried by the diaphragm and projects therefrom on both sides of the diaphragm in the (preferably horizontal) direction of diaphragm displacement. Specifically, the locality of pivotal support of the leaf spring is positioned above one end of the rod, and the free end of the leaf spring extends generally horizontally therefrom toward the diaphragm above and in generally parallel relation to the axis of the rod. The surface of the spring-supporting means against which the spring free end is deformed lies in a substantially horizontal plane immediately above the latter free end. Beyond the locality of pivotal support, the spring is bent downwardly to form a depending leg which is connected by means of an adjustable screw to the adjacent end of the rod. It is also preferred that the length of the spring free end on one side of the pivotal support be substantially greater than the length of the depending leg on the other side of the pivotal support, so that the biasing force produced by deformation of the spring free end is amplified as applied to the diaphragm.

The pivotal support of the spring may be provided by engagement of a pair of tabs, formed integrally with and projecting laterally from the sides of the spring, with notches formed in the supporting means. For assured proper bearing engagement of the tabs in the notches, a small counterweight may be secured to the spring free end adjacent the locality of pivotal support.

The armature of the differential transformer may be carried by the other end of the rod, which may be surrounded with clearance by a hollow cylindrical element that supports, on its external surface, the primary and secondary windings of the transformer. For calibration purposes, the axial position of these windings on the cylindrical element may be adjustable.

In this way, there is provided, with a relatively simple mechanical structure, an electrical output signal that is linearly proportional to rate of fluid flow. The described device exhibits advantageously high accuracy even at low flow rates owing in particular to the substantial freedom from frictional loading of either the movable diaphragm or the biasing spring. The device has wide application, being connectable to any fluid conduit by means of lengths of tubing for communicating upstream and downstream pressures to be two pressure chambers, and providing an electrical signal which may be transmitted through suitable wiring to actuate a remote indicator or recorder. The construction of the device is such as to facilitate disassembly, reassembly and calibration by simple mechanical operations.

Further features and advantages of the invention will be apparent from the detailed description hereinbelow set forth, together with the accompanying drawings.

BRIEF DESCRIPTION OF THE DRAWINGS

FIG. 1 is a plan view of a device embodying the invention in a particular form, connected to a fluid conduit for measuring flow rate of fluid through the conduit by sensing the differential pressure across a restriction established therein;

FIG. 3 is a view taken along the line 3—3 of FIG. 2; and

FIG. 4 is a view taken along the line 4—4 of FIG. 2.

DETAILED DESCRIPTION

Figure 2:
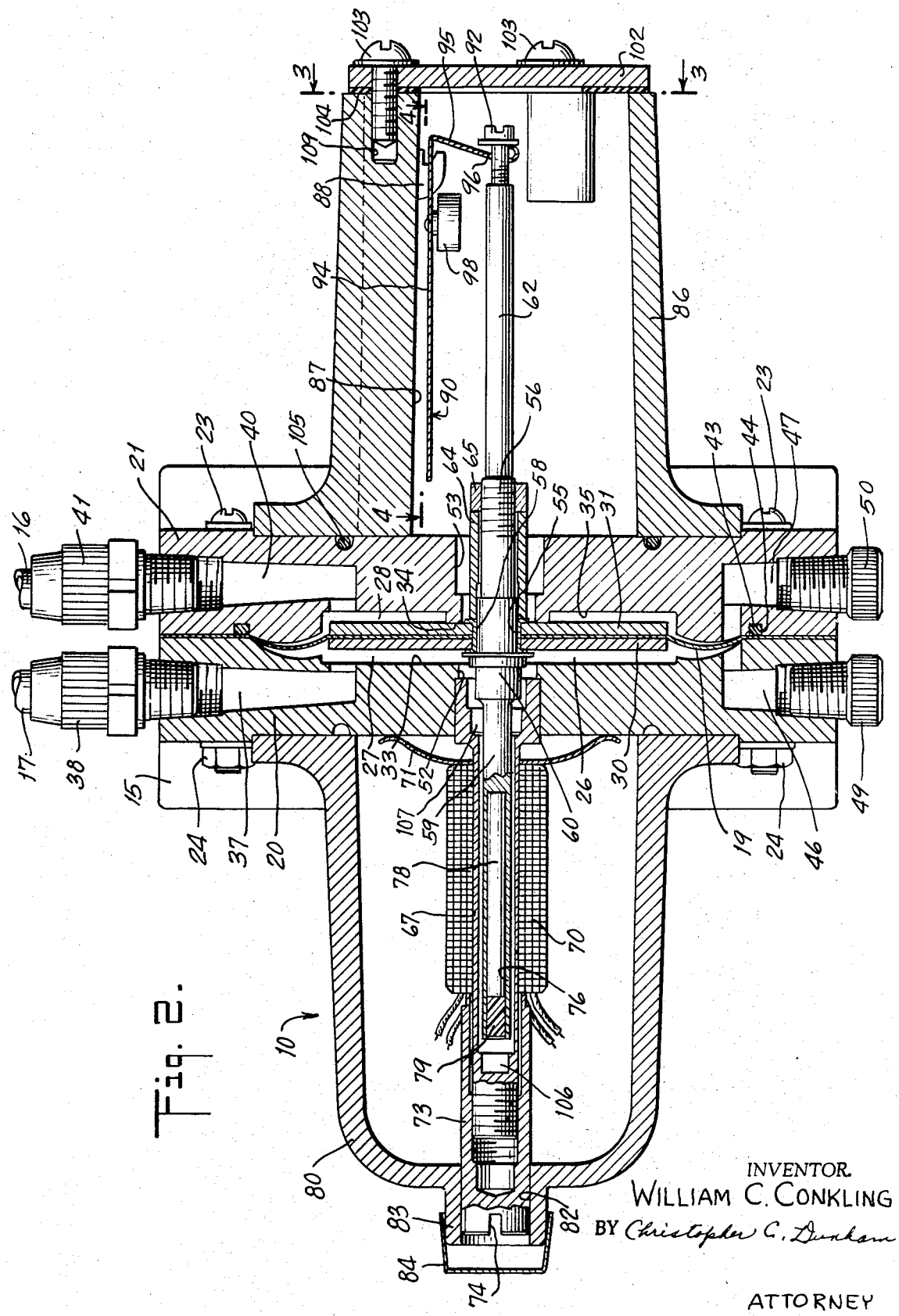
FIG. 2 is an enlarged sectional elevational view of the device of FIG. 1, taken along the line 2—2 of FIG. 1.

Referring to the drawings, the invention in its illustrated embodiment comprises a device 10 for sensing differential pressure in a fluid conduit 11 (e.g., a gas conduit in conventional chlorinator apparatus) and converting the sensed value of differential pressure to an electrical output signal representative of the rate of flow of fluid through the conduit. The differential pressure is measured across a restriction in the conduit, provided by connecting therein a conventional adjustable orifice unit 12 having a manually operable handle 14 for varying the size of the restriction. The device 10 is secured as by a mounting plate 15 to a wall of the chlorinator apparatus.

Fluid pressure in the conduit is communicated to the device 10 by a first flexible tube 16 connecting the device to a locality in the conduit upstream of the restriction and a second flexible tube 17 connecting the device to a locality in the conduit downstream of the restriction. The electrical output signal from the device 10 is transmitted as by suitable wiring (not shown) to indicator apparatus (also not shown) actuable by such signal to provide a reading or record of rate of flow, and/or to control instrumentalities, e.g., for regulating the flow rate.

As more particularly shown in FIG. 2, the device 10 includes a disc-shaped flexible diaphragm 19 and a pair of rigid disc-shaped flange elements 20 and 21, respectively, disposed on opposite sides of the diaphragm in facing relation thereto. The periphery of the diaphragm is clamped between peripheral annular portions of the two flange elements, which are held together by screws 23 extending through screw holes (not shown) in the two flange elements and the diaphragm and secured by nuts 24. The surfaces of the two flange elements facing the diaphragm are recessed in their central portions to provide an enclosed space 26 across which the diaphragm extends. The diaphragm divides the space 26 into two chambers 27 and 28 and is movable through the space in a direction perpendicular to its major surfaces, being in slack condition so as to afford minimal resistance to such movement.

The central portion of the diaphragm within the space 26 bears on its opposite surfaces a pair of reinforcing discs 30 and 31. The limit of diaphragm movement toward the left (as seen in FIG. 2) is established by abutment of the disc 30 with the recessed surface 33 of the left-hand flange element 20 (which forms the left-hand wall of space 26), while the limit of diaphragm movement in the opposite direction is established by abutment of the right-hand reinforcing disc 31 with an annular projection 34 centrally located in the recessed surface 35 of the right-hand flange element 21 which forms the right-hand wall of space 26. The extent of diaphragm movement between these limiting positions is small in relation to the diameter of the space 26, and may be, for example, a minor fraction of an inch. Preferably, the device 10 as mounted for operation is so oriented that the major surfaces of the diaphragm 10 (and of flange elements 20 and 21) lie in vertical planes, the direction of motion of the diaphragm then being horizontal.

The left-hand flange element 20 has a fluid passage 37 extending radially inward from its outer edge and communicating with the chamber 27. The outer extremity of passage 37 is internally threaded to receive a fitting 38 carried by one end of the tube 17; thus fluid pressure from the downstream side of the aforementioned restriction in conduit 11 is transmitted to the chamber 27. The right-hand flange element 21 has a similar fluid passage 40 extending radially inward from its outer edge to the chamber 28 and threaded to receive a fitting 41 carried by one end of the tube 16 for transmission of fluid pressure from the upstream side of the restriction in conduit 11 to chamber 28. Accordingly, the fluid pressures upstream and downstream of the restriction in the conduit 11 act against the opposite surfaces of the diaphragm 19 in the space 26, and the diaphragm undergoes displacement through the space (between the aforementioned limits of its left-hand and right-hand movement) in response to changes in the pressure differential between these upstream and downstream localities.

Since the right-hand chamber 28 is connected to the conduit upstream of the restriction, the pressure in chamber 28 is higher than that in chamber 27 when fluid is flowing through the conduit. Consequently, the right-hand limit of diaphragm movement is the zero position of the diaphragm, corresponding to zero pressure differential (i.e., zero flow rate) across the restriction in conduit 11, while the left-hand limit of diaphragm movement corresponds to the maximum value pressure differential to which the device responds. In other words, as the differential pressure across the restriction in conduit 11 increases from zero to such maximum value, the diaphragm moves progressively leftward through space 26 from its right-hand limiting position to its left-hand limiting position. The position of the diaphragm within the space 26 at any instant is determined by the differential pressure across the restriction in conduit 11 at such instant.

As further shown in FIG. 2, an O-ring 43, received in an annular groove 44 in that surface of the peripheral portion of flange element 21 which engages the right side of the periphery of diaphragm 19, serves as a seal to prevent escape of fluid from the space 26, and as a compressive element to urge the diaphragm against flange element 20, the diaphragm and O-ring thus cooperating to provide an effective gas seal for prevention of fluid leakage from both chambers 27 and 28. To enable discharge of fluid from the space 26, a pair of outlet ports 46 and 47 are respectively formed in the flange elements 20 and 21, i.e., extending radially outward from the chambers 27 and 28 to the outer edges of the respective flange elements, and are normally closed by threaded plugs 49 and 50.

The centers of the flange elements 20 and 21 have coaxial bores, respectively designated 52 and 53. Through a central hole 55 formed in the diaphragm 19 and its reinforcing discs 30 and 31 there extends a rigid rod 56 which is axially perpendicular to the major surfaces of the diaphragm and projects for a substantial distance on each side of the diaphragm. The left- and right-hand portions of the rod respectively extend with clearance through the bores 52 and 53 of the respective flange elements 20 and 21. An annular seal 58 is fitted around the rim of hole 55 in engaging relation to the rod 56 to prevent passage of gas around the rod between the two chambers 27 and 28, the rod being, however, slidable in an axial direction relative to the seal.

The portion 59 of rod 56 projecting to the left of the diaphragm as seen in FIG. 2 has an enlargement 60 adjacent to the diaphragm; this enlargement, in operative position, abuts and engages the left-hand side of the annular seal 58. The portion 62 of rod 56 projecting to the right of the diaphragm as seen in FIG. 2 is surrounded, adjacent to the diaphragm, by a thrust sleeve 64, the left-hand end of which in operative position abuts the right-hand edge of the annular seal. At the locality of the right-hand edge of the thrust sleeve, the rod portion 62 is externally threaded so as to be engageable by a nut 65 which in operative position bears against the thrust sleeve. As shown, the nut 65 when threaded on rod portion 62 holds the rod enlargement 60 and the thrust sleeve 64 securely in abutting relation to the opposite edges of the annular seal 58 and thus secures the rod to the diaphragm so that as the diaphragm moves (in response to changes in pressure differential), the rod 56 is carried therewith, moving in an axial direction.

The left-hand portion 59 of rod 56 is concentrically surrounded, with clearance, by a rigid cylindrical support element 67 fixedly mounted in the bore 52 of flange element 20 and extending to the left of that flange element as seen in FIG. 2. The central bore of this support element 67, within which the rod portion 59 is received, is of sufficient axial length to permit free axial movement of the rod therein, in correspondence with diaphragm displacement, over the full range of diaphragm positions.

A differential transformer 70, e.g., of conventional character and comprising primary and secondary windings, is supported on the external surface of the element 67, concentrically surrounding that element and being axially slidable relative thereto. The right-hand end of the transformer 70 abuts a spring 71 which bears against the flange element 20 and urges the transformer to the left as seen in FIG. 2. The left-hand end of the transformer is engaged by the extremity of a calibrating sleeve 73 which is threaded on, and projects leftwardly beyond, the left-hand end of the support element 67. Turning of the sleeve 73 relative to the support element 67 (as by means of a screwdriver received in a notch 74 formed in the left-hand end of sleeve 73), in a direction to cause the sleeve to be screwed onto the support element 67, moves the transformer 70 to the right against the biasing force of spring 71; turning of sleeve 73 in the opposite direction causes the transformer to be moved to the left by the force of spring 71. Thus the sleeve 73, coacting with the spring 71, enables adjustment of the position of the transformer along the support element 67.

An axial bore 76 is formed in the left-hand rod portion 59, extending inwardly from the left-hand end of the rod. Within this bore is positioned a rod-shaped armature 78 for the differential transformer 70, the armature being held fixed in position relative to the rod by a plug 79 inserted in the bore 76. When the primary winding of the differential transformer 70 is suitably excited with alternating current, an output voltage is induced in the secondary winding, and the magnitude of this output voltage is determined by the position of the armature 78 relative to the transformer windings; movement of the armature-carrying rod 56 with diaphragm 19 effects a change in the transformer output voltage which is precisely proportional to such movement. The output voltage of the secondary winding constitutes the electrical output signal of the device 10 and is coupled, as stated, through conventional wiring to appropriate indicating and/or control circuitry (not shown).

The described elements projecting to the left of the flange element 20, and including support element 67, transformer 70 and sleeve 73, are surrounded by a housing 80 which is secured as by screws to the flange element 20. The sleeve 73 projects through an opening 82 in the housing 80, being thus supported by the housing and accessible from the exterior thereof. The sleeve 73 is rotatable relative to the surfaces of opening 82, which has an outwardly projecting lip 83 that may be normally closed by a cap plug 84.

Surrounding the right-hand rod portion 62 in spaced relation thereto is a hollow housing 86 secured as by screws to the flange element 21 and open at its outer (i.e., right-hand) end. This housing has an essentially horizontal and planar internal upper surface 87, extending above and parallel to the right-hand rod portion 62 for a distance somewhat greater than the axial extent of portion 62 to the right of flange element 21. On opposite sides of the surface 87, above the right-hand extremity of rod portion 62, are positioned a pair of fixed brackets 88 formed integrally with the housing 86.

A range spring 90 (fabricated of a suitable spring metal) is pivotally supported by the brackets 88 and is connected to the rod portion 62 by means of a screw 92 threaded in the right-hand end of rod portion 62. This range spring comprises an elongated spring leaf 94 which extends leftwardly from the brackets 88 for a substantial distance toward the flange element 21 immediately beneath and in generally parallel relation to the flat housing surface 87, and is bent immediately to the right of the brackets so as to form a depending leg 95 (short in relation to the long dimension of spring leaf 94) which extends down to and is engaged by the head of screw 92. The lower extremity of leg 95 projects below the shank of screw 92 and is recurved upwardly to the right, the uppermost extremity of this recurved portion engaging the rear of the screw head. The screw 92 extends through a hole 96 in spring leg 95, so that the spring supports the righ-hand end of rod 56. Intermediate the spring leaf and the leg 95, as particularly shown in FIGS. 3 and 4, the spring includes a pair of sidewardly projecting tabs 97 which seat in notches 97a formed in the brackets 88 to provide the desired pivotal support of the spring on the brackets. A small counterweight 98 is carried by the spring leaf 94, slightly to the left of the brackets, to maintain the desired bearing engagement of the tabs 97 with the brackets 88.

The disposition of the spring, and its connection with the rod portion 62, are such that when the rod and diaphragm are at the extreme right-hand limit of their path of travel as seen in FIG. 2, the free left-hand end of the spring leaf 94 is disposed below and spaced away from the flat housing surface 87. The precise disposition of the spring in this zero position may be adjusted by turning the screw 92. As the rod and diaphragm move to the left, the leftward force exerted on the lower extremity of the spring leg 95 by such rod movement causes the spring to pivot about the brackets 88, displacing the free left-hand end of spring leaf 94 upwardly into engagement with the housing surface 87. The resultant deformation of the spring leaf opposes the pivotal motion of the spring and thus exerts a biasing or restoring force on rod 56 tending to urge the rod and diaphragm 19 back toward the right. Further leftward motion of the diaphragm and rod continues the pivotal motion of the spring causing a progressively increasing area of the spring leaf to engage the housing surface 87; such progressively increasing engagement of the spring with the surface in turn exerts an exponentially increasing restoring force on the rod and diaphragm, i.e., a force tending to return the rod and diaphragm to the right. This exponentially varying biasing force is amplified owing to the fact that the spring leaf portion 94 of spring 90 on one side of the fulcrum point provided by brackets 88 is longer than the depending leg portion of the spring on the other side of the fulcrum point. Because the motion of the spring is pivotal about the fulcrum point, there is no sliding or rubbing friction between the spring and the surface it engages such as might tend to contribute to the restoring force exerted on the diaphragm and to cause departure of the total restoring force from the desired exponential relation to diaphragm displacement.

The nature of this exponential relation is determined by the configuration of the spring 90. Specifically, in the embodiment of the invention herein described, the spring is shaped to exert a biasing force (on rod 56) which varies with the differential pressure acting on diaphragm 19 in such manner that the displacement of the diaphragm from zero position is linearly proportional to the square root of the differential pressure and hence linearly proportional to the rate of fluid flow through conduit 11. Stated in other words, the increase in spring-biasing force that opposes leftward movement of the diaphragm as the diaphragm is displaced progressively to the left of the zero position is so related to the extent of such displacement as to afford the desired square root relation between diaphragm displacement and displacing (i.e., differential pressure) force.

One suitable spring configuration found to provide a biasing force that varies in this way is illustrated in FIG. 4. In the form of spring there shown, the spring leaf 94 is symmetrical in a horizontal plane about a center line which parallels the rod portion 62. The left-hand extremity of the spring leaf is shaped as a thin, elongated and straight-sided tongue 99, the edges of which curve outwardly (i.e., diverging toward the right in FIG. 4) to a short, straight-sided and relatively broad portion 100 of the spring leaf which joins the tabs 97.

To further illustrate the dimensional proportions of this particular form of spring, reference may be had to a specific example of a spring having such form. In this example, the spring leaf 94 extends for 2¾ inches to the left of bearing edges 97a of tabs 97 as seen in FIG. 4, and is flat within ±.003 inch for a distance of at least 2 inches from its left-hand tip, which is of semicircular configuration curved on a ¹⁄₃₂-inch radius. For a distance of 1⅛ inch to the right of the tip, the tongue portion 99 has straight, parallel, horizontal edges and is between .048 and .052 inch wide. To the right of this tongue portion, each edge of the leaf curves outwardly from the center line on a one-inch radius about a point located 1⅝ inch to the left of the tab edges 97a and between .9865 and .9905 inch from the center line of the spring leaf. The outward curves continue to points spaced ⅝ inch from the center line, and the side edges of the spring leaf extend to the right from these points to the tab edges 97a in parallel relation to the center line, forming the broad portion 100 of the spring leaf. The counterweight 98 is secured to the latter portion, being positioned on the center line of the spring leaf, ½ inch to the left of the tab edges 97a. The tabs extend ⁷⁄₃₂ inch to the right of the edges 97a, and at their right-hand extremity the depending leg 95 of the spring is bent downwardly about ¹⁄₁₆-inch radius to form an angle of 70° to the leaf 94, this angle opening to the left as seen in FIG. 2. The length of the depending leg is ¹³⁄₁₆ inch, and the leg tapers inwardly from the tabs to a width of ⅝ inch at its terminal extremity, which is recurved to the right about a ¹⁄₁₆-inch radius through approximately 180° of angle.

Referring again to FIG. 2, the right-hand end of housing 86 is closed by a cover plate 102 secured to the housing by three screws 103. A gasket 104 is interposed between the cover plate and the housing to prevent escape of gas from the interior of the housing. There is also provided an O-ring 105 between the housing 86 and the flange element 21 to provide complete gas-tight sealing of the space within housing 86, which communicates with chamber 28.

The operation of the described device may now be readily understood. With the two chambers 27 and 28 connected respectively to the lengths 17 and 16 of plastic tubing as described, fluid pressure upstream of the restriction in conduit 11 is communicated to chamber 28 and pressure downstream of the restriction is communicated to chamber 27, the pressure in chamber 28 thus being greater than that in chamber 27. Accordingly, the slack diaphragm 19 is caused to assume a position within the space 26 which is determined by the pressure drop across the restriction in conduit 11. As the pressure differential increases, the diaphragm moves to the left in space 26, and returns to the right with decrease in pressure differential.

The pressure differential across the restriction in the conduit 11 is, as stated, proportional to the square of the rate of fluid flow through the conduit. If the diaphragm were displaced in linear relation to change in this pressure differential, its displacement across space 26 would be proportional to the square of the flow rate. However, the exponentially varying force exerted on the rod and diaphragm by the spring 90 opposes the force exerted on the diaphragm by the pressure differential in such manner that the diaphragm displacement is substantially linearly proportional to change in rate of flow. That is to say, the spring acts as a square root extractor, causing the diaphragm to move in linear proportion to the square root of the force exerted on it; and the rate of flow being linearly proportional to the square root of such force, the motion of the diaphragm and of rod 56 is accordingly linearly proportional to the rate of flow.

As already explained, the output voltage signal produced in the secondary winding of the differential transformer 70 (with the primary winding excited by alternating current) is directly proportional to the displacement of the armature 78 which moves with rod 56; consequently, this output voltage signal is as desired essentially linearly proportional to the rate of flow, constituting an electrical output indication or control signal which is a linear function of the flow rate.

In use of the device to measure modest ranges of pressure differential, e.g., zero to ten inches of water, one-tenth of the total diaphragm motion must be generated by 0.1 inch of water pressure differential, owing to the described square root relation of diaphragm motion to change in pressure differential. To accomplish this, the range spring 90 may be set by adjusting the screw 92 so that the spring does not come into contact with the housing surface 87 during an initial portion of the first 10% of diaphragm motion from zero position, as there is a small amount of diaphragm resistance that must be overcome. In other words, the resistance of the spring only begins to be exerted after the diaphragm has travelled part of the way through the first 10% of its motion, since the very small force initially exerted on the diaphragm might be insufficient to overcome the additive effect of diaphragm resistance and spring bias, with the result that errors might be introduced in measurement of flows at the lower end of the operating range of the device.

The illustrated device may readily be disassembled for service or cleaning, and, as explained below, its structure affords particular advantages with respect to ease of reassembly. To effect disassembly, the cover plate 102 is first removed and the screw 92 is disengaged from the rod for removal of the spring 90. The housing 86 and right-hand flange element 21 are successively removed by unthreading the screws which hold them in place. Diaphragm 19, with its associated rod 56, may then be lifted out, affording access to the interior of the space 26 and its associated passages.

To facilitate reassembly of the device, the bore of the support element 67 may terminate at its inner or left-hand extremity in a socket 106, coaxial with the bore and having a diameter just sufficient to accommodate snugly the left-hand end of rod 56. Similarly, the right-hand extremity of the support element 67 may be shaped to provide a socket 107 dimensioned to receive snugly the enlargement 60 of the left-hand rod portion 59 adjacent the diaphragm. The sockets 106 and 107 are disposed somewhat to the left of the left-hand limit of travel of the rod portions they are dimensioned to receive, and are spaced from one another so that when the left-hand end of rod portion 59 is received in socket 106, the enlargement 60 is concomitantly received in socket 107.

For reassembly, the housing 80 and flange element 20 are preferably oriented in axially vertical position with the element 20 facing upwardly. The diaphragm 19 is placed on the upwardly facing surface of flange element 20, and the nut 65 is unscrewed so that the rod 56 slides downwardly relative to the diaphragm until the left-hand end of rod portion 59 seats in socket 106 and the enlargement 60 seats in socket 107. In this way, the rod is readily aligned in proper axial position so that when reassembly is complete it will move freely within the bore of support element 67, with no sliding or rubbing friction.

The screw holes of the diaphragm are aligned with those of flange element 20, and right-hand flange element 21 is next placed in position over the diaphragm with its screw holes aligned with those of flange element 20. The adjusting screw 92 is partially threaded into the right-hand end of the rod 56 to assist in alignment of the flange element 21 and housing 86, which is placed in position on the latter flange element. The flange element 21 is shifted with respect to the flange element 20 until the screw 92 is centered with respect to the holes 109 provided in the right-hand end of housing 86 for the screws 103 that hold cover plate 102, these screw holes being so positioned in the housing 86 that the centering of the screw 92 relative thereto assures proper alignment of the housing and flange element 21 with respect to the flange element 20.

The two flange elements (with the diaphragm between them) are then secured together by the screws 23 and nuts 24, and housing 86 is removed once more. With rod 56 held against turning, the nut 65 is tightened, drawing the rod up into operative position out of the sockets 106 and 107 and securing it again to the diaphragm 19. Thereafter, the spring 90 is replaced in its operative position and the screw 92 is adjusted relative to the rod 56 so that the free end of the spring leaf portion 94 is slightly spaced from the flat housing surface 87 when the diaphragm and rod are at zero position. The device is then remounted in its normal operative position, i.e., with the axis of rod 56 oriented horizontally and the surface 87 disposed above the rod in a horizontal plane.

A further advantage of the device is the ease with which it may be calibrated. To calibrate the device (the chambers 27 and 28 being connected to plastic tubing lengths 17 and 16), alternating current is supplied to the transformer so that an output voltage is generated to actuate the indicator mechanism associated with the device. With no gas flow through the conduit 11, the cap plug 84 is removed and the sleeve 73 is turned to adjust the position of the transformer 70 on support element 67 until the indicator or recorder connected to the transformer reads zero. The chlorinator is then set to provide the maximum gas flow to be measured with the device, and the differential pressure signal to the device is adjusted by varying the dimensions of the restriction in the conduit by means of handle 14 until the indicator reading correctly shows maximum flow. Finally, the chlorinator is set to provide a relatively low gas flow (e.g., 10–20% of maximum) and the indicator reading is compared with the known preset flow for accuracy. If the indicator reading is too high, the screw 92 is turned clockwise (threaded further into rod 56) to increase the biasing force of spring 90 and thus reduce the reading; if the indicator reading is too low, screw 92 is unscrewed until the reading increases to the proper value. Calibration is then complete and the cover plate 102 is replaced on the housing 86.

It is to be understood that the invention is not limited to the features and embodiments hereinabove specifically set forth but may be carried out in other ways without departure from its spirit.

I claim:

1. In a device for producing, in response to a displacing force, an output motion representative of a value exponentially related to the displacing force, in combination:
   (a) a movable element disposed and arranged to be acted on by the displacing force and to undergo bi-directional displacement along a limited path in response to variations in magnitude of said force;
   (b) a leaf spring having a first, free end and a second end connected to said movable element; and
   (c) means fixed in relation to said path for pivotally supporting said spring intermediate the ends thereof so that displacement of said element effects pivotal movement of said spring relative to said supporting means, said supporting means having a surface positioned to be progressively engaged by said spring free end upon pivotal motion of said spring in correspondence with progressive displacement of said element in a given direction in said path, for deforming said spring free end to exert on said element a biasing force opposing displacement of said element in said given direction, said spring free end being shaped so that the biasing force thereby exerted is exponentially related to said displacing force in such manner that movement of said element in response to change in said displacing force is substantially linearly proportional to said value.

2. In a device for producing an output signal representative of flow rate of a fluid in response to sensed magnitude of differential pressure between two points in the path of flow of the fluid, in combination,
   (a) structure defining first and second fluid-receiving chambers respectively adapted to communicate with said two points;
   (b) a diaphragm having opposed major surfaces peripherally supported by said chamber-defining structure between said chambers with said major surfaces respectively exposed to said chambers, a central portion of said diaphragm being displaceable in response to variation in the pressure differential between said first and second chambers;
   (c) a leaf spring having a first, free end and a second end connected to said diaphragm central portion; and
   (d) means fixed in relation to said chamber-defining structure for pivotally supporting said spring intermediate the ends thereof so that displacement of said diaphragm central portion effects pivotal movement of said spring relative to said supporting means, said supporting means having a surface positioned to be progressively engaged by said spring free end upon pivotal motion of said spring in correspondence with progressive displacement of said diaphragm central portion effected by increasing pressure differential, for deforming said spring free end to exert on said diaphragm central portion a biasing force opposing displacement of said diaphragm central portion, said spring free end being shaped so that the biasing force thereby exerted is exponentially related to the differential pressure acting on said diaphragm central portion in such manner that displacement of said diaphragm central portion in response to change in said pressure differential is substantially linearly proportional to the square root of said pressure differential.

3. A device as defined in claim 2, including a rod carried by said diaphragm central portion and projecting therefrom in the direction of displacement of said diaphragm central portion, wherein said spring is pivotally supported by said supporting means at a locality adjacent to an end of said rod remote from said diaphragm but spaced transversely from said rod, wherein said spring free end extends toward said diaphragm from said last-mentioned locality in substantially parallel relation to the axis of said rod, wherein said surface of said supporting means extends in a plane generally parallel to said spring free end and is disposed on the side of said spring free end opposite to said rod, and wherein said second end of said spring is bent adjacent to said locality of pivotal support of said spring, so as to project transversely therefrom to said rod end, said second spring end being secured to said rod end.

4. A device as defined in claim 3, wherein the length of said spring free end on one side of said locality of pivotal support of said spring is substantially greater than the length of said second spring end on the other side of said last-mentioned locality.

5. A device as defined in claim 3, including means responsive to displacement of said diaphragm for producing an electrical output signal linearly proportional to displacement of said diaphragm.

6. A device as defined in claim 5, wherein said signal-producing means comprises a differential transformer, including an armature carried by and axially movable with said diaphragm central portion, and primary and secondary windings concentrically surrounding the path of axial movement of said armature.

References Cited

UNITED STATES PATENTS

| | | | |
|---|---|---|---|
| 2,160,266 | 5/1939 | Grisdale | 73—205 |
| 2,487,310 | 11/1949 | Chandler | 74—522 |
| 3,006,190 | 10/1961 | Jansson | 73—205 |
| 3,287,971 | 11/1966 | Bahniuk | 73—210 |
| 3,378,706 | 4/1968 | Franzene | 267—1 |

RICHARD C. QUEISSER, Primary Examiner

E. J. KOCH, Assistant Examiner

U.S. Cl. X.R.

267—1